(12) United States Patent
Boghozian et al.

(10) Patent No.: US 10,717,836 B1
(45) Date of Patent: Jul. 21, 2020

(54) ALTERNATIVE RESIN SYSTEMS FOR THERMAL PROTECTION MATERIALS

(71) Applicant: USA as Represented by the Administrator of the National Aeronautics and Space Administration, Washington, DC (US)

(72) Inventors: Tane Boghozian, Redwood City, CA (US); Margaret M. Stackpoole, Santa Clara, CA (US)

(73) Assignee: United States of America as Represented by the Administrator of NASA, Washington, DC (US)

( * ) Notice: Subject to any disclaimer, the term of this patent is extended or adjusted under 35 U.S.C. 154(b) by 467 days.

(21) Appl. No.: 15/171,635

(22) Filed: Jun. 2, 2016

Related U.S. Application Data

(60) Provisional application No. 62/169,980, filed on Jun. 2, 2015.

(51) Int. Cl.
*C08J 5/24* (2006.01)
*C08G 73/06* (2006.01)
*C08J 5/04* (2006.01)
*C08L 79/04* (2006.01)

(52) U.S. Cl.
CPC ............ *C08J 5/24* (2013.01); *C08G 73/0655* (2013.01); *C08J 5/042* (2013.01); *C08L 79/04* (2013.01); *C08J 2379/04* (2013.01)

(58) Field of Classification Search
CPC ...... C08L 79/04; C09D 179/04; C09J 179/04; C08J 2379/04; C08J 5/24; C08J 5/042; C08G 73/18; C08G 73/0622–0661
See application file for complete search history.

(56) References Cited

U.S. PATENT DOCUMENTS

| | | | | |
|---|---|---|---|---|
| 4,110,364 A * | 8/1978 | Gaku | .................. | C08G 73/121 430/283.1 |
| 5,350,828 A * | 9/1994 | Keller | .................... | C08G 73/00 525/418 |
| 5,536,562 A * | 7/1996 | Tran | ........................ | B64G 1/58 244/121 |
| 6,001,926 A * | 12/1999 | Sastri | ..................... | C08G 73/00 427/385.5 |
| 9,139,750 B2 * | 9/2015 | He | .......................... | B32B 15/08 |

(Continued)

FOREIGN PATENT DOCUMENTS

CN 103709746 A * 4/2014

OTHER PUBLICATIONS

Partial machine translation of CN-103709746-A.*

(Continued)

*Primary Examiner* — Kregg T Brooks
(74) *Attorney, Agent, or Firm* — Rhys W. Cheung; Meredith K. Blasingame; Robert M. Padilla

(57) ABSTRACT

Thermal protective materials suitable for use in a spacecraft include a substrate, such as carbon fibers or carbon felt, and cyanate ester resin or phthalonitrile resin, and cross-linkers. These thermal protective materials have a density of about 0.2 to about 0.35 g/cm³. Methods of making the thermal protective materials include mixing a cyanate ester resin or a phthalonitrile resin and a cross-linker to result in a resin solution, infusing the resin solution into a substrate, and curing the resin to result in the thermal protective material.

25 Claims, 3 Drawing Sheets

(56) References Cited

U.S. PATENT DOCUMENTS

| | | | | |
|---|---|---|---|---|
| 2006/0194944 A1* | 8/2006 | Fowler | ................ | C08G 73/00 528/362 |
| 2008/0166511 A1* | 7/2008 | Honma | ................ | C08G 59/50 428/36.4 |
| 2008/0176987 A1* | 7/2008 | Trevet | ................ | C08K 3/346 524/447 |

OTHER PUBLICATIONS

Tane Boghozian, Margaret Stackpoole, and Matt Gasch; Cyanate Ester and Phthalonitrile Impregnated Carbon Ablative TPS, Conference Paper, 36th High Temperature Polymeric Laminate Workshop, Jan. 25-28, 2016, Palm Springs, CA, abstract from NASA Technical Reports Server (2016).*

Tran, H.K., "Development of Lightweight Ceramic Ablators and Arc jet Test Results," NASA TM 108798 Jan. 1994.

Wright, M.J., Highes, M., Calomono, A., and Barnhardt, M.D., "An Overview of Technology Investments in the NASA Entry Systems Modeling Project," AIAA Paper 2015-1892, Jan. 2015.

Frank S. Milos, Matthew J. Gasch, and Dinesh K. Prabhu. "Conformal Phenolic Impregnated Carbon Ablator Arcjet Testing, Ablation, and Thermal Response," Journal of Spacecraft and Rockets (In publishing 2015) doi: 10.2514/1.A33216.

Beck, R.A.S., Driver, D.M., Wright, M.J., Hwang, H.H., Edquist, K.T., and Sepka, S.A., "Development of the Mars Science Laboratory Heatshield Thermal Protection System," Journal of Spacecraft and Rockets, vol. 51, No. 4, 2014, pp. 1139-1150. doi: 10.2514/1.A32635.

"PICA Heat Shield," SpaceX, Apr. 4, 2014, http://www.spacex.com/news/2013/04/04/pica-heat-shield [retrieved Nov. 17, 2014].

Empey, D.M., Skokova, K.A., Agrawal P., Swanson G., Prabhu, D.K., Peterson K.H., and Venkatapathy E., "Small Probe Reentry Investigation for TPS Engineering (SPRITE)", proceedings, 8th International Planetary Probe Workshop, Portsmouth, VA, Jun. 6-10, 2011.

Anon., "Standard Test Method for Measuring Heat-Transfer Rate Using a Thermal Capacitance (Slug) Calorimeter," ASTM International STD E-457-08, Conshohocken, PA, 2008, doi: 10.1520/E0457-08.

Wright, M.J., Candler, G.V., and Bose, D., "Data-Parallel Line Relation Method for Navier-Stokes Equations," AIAA Journal, vol. 36, No. 9, 1998, pp. 1603-1609. doi: 10-2514/2.586.

* cited by examiner

ALTERNATIVE RESIN SYSTEMS FOR THERMAL PROTECTION MATERIALS

CROSS-REFERENCE TO RELATED APPLICATIONS

This application claims the benefit of U.S. Provisional Application No. 62/169,980, filed Jun. 2, 2015, which is hereby incorporated by reference herein in its entirety, including but not limited to those portions that specifically appear hereinafter, the incorporation by reference being made with the following exception: In the event that any portion of the above-referenced provisional application is inconsistent with this application, this application supercedes said above-referenced provisional application.

ORIGIN OF INVENTION

The invention described herein was made in the performance of work under a NASA contract and by an employee of the United States Government and is subject to the provisions of Public Law 96-517 (35 U.S.C. § 202) and may be manufactured and used by or for the Government for governmental purposes without the payment of any royalties thereon or therefor. In accordance with 35 U.S.C. § 202, the contractor has elected not to retain title.

BACKGROUND OF THE INVENTION

Since its development in the 1990s, Phenolic Impregnated Carbon Ablator (PICA) has been the state-of-the-art material for light-weight ablative thermal protection systems (TPS). PICA was developed by NASA and served as the heat shield material for the Stardust sample return capsule and Mars Science Laboratory. However, PICA has some disadvantages such as brittleness, low char yield, low decomposition onset temperature, and low glass transition temperature.

Recent research has investigated flexible and conformal pyrolyzing ablators. One product of this research was Conformal Phenolic Impregnated Carbon Ablator (CPICA), which uses a carbon felt substrate with a phenolic polymer matrix similar to that of PICA.

Although phenolic resin has an extensive history in high- and low-density TPS materials, it would be an advance in the art to develop alternative resins that offer advantages such as higher char yield, higher char strength, higher decomposition onset temperature, and increased glass transition temperature as compared to state-of-the-art phenolic. It would be advantageous to develop new classes of TPS materials that generate no volatiles during curing, are low in density, and have a polymer morphology similar that of phenolic in PICA.

BRIEF SUMMARY OF THE INVENTION

Illustrative embodiments of the present invention provide improvements as TPS materials compared to known materials.

For example, an illustrative method of making a thermal protection material comprises:
  (A) mixing a cyanate ester resin with a solvent and a cross-linker to result in a resin solution;
  (B) infusing the resin solution into a substrate; and
  (C) curing the resin to result in the thermal protection material.

Illustrative solvents that can be used according to the method include adiponitrile, dimethylsulfoxide, and N-methyl-2-pyrrolidone, or mixtures thereof. An illustrative cross-linker comprises hexamethylenetetramine. Illustrative substrates comprise carbon fibers or carbon felt. The resin may be cured in air at a temperature of up to about 280 degrees C. The resulting thermal protection material has a density of about 0.2 to about 0.35 g/cm$^3$.

Another illustrative embodiment of the invention comprises a method of making a thermal protection material, the method comprising:
  (A) mixing phthalonitrile with a solvent and two cross-linkers to result in a resin solution;
  (B) infusing the resin solution into a substrate; and
  (C) curing the resin to result in the thermal protection material.

Illustrative solvents comprise adiponitrile, dimethylsulfoxide, and N-methyl-2-pyrrolidone, or mixtures thereof. An illustrative cross-linker comprises hexamethylenetetramine. Illustrative substrates comprise carbon fibers or carbon felt. The resin is cured in air at a temperature of up to about 280 degrees C. The resulting thermal protection material has a density of about 0.2 to about 0.35 g/cm$^3$.

Another illustrative embodiment of the invention comprises a thermal protection material comprising a substrate with cross-linked cyanate ester resin or a cross-linked phthalonitrile resin. The resins, CE and PHTH, along with solvent and cross linkers are infused into the substrate, thereby cross-linking occurs. Thus, for example, the thermal protection material may comprise cyanate ester resin comprising hexamethylenetetramine residues as a cross-linker. An another example, the thermal protective material may comprise phthalonitrile resin comprising hexamethylenetetramine residues and 4,4'-diaminodiphenylmethane as a cross-linker. Illustrative substrates comprise carbon fibers or carbon felt. The thermal protective material has a density of about 0.2 to about 0.35 g/cm$^3$.

DETAILED DESCRIPTION

Before the present alternative resin systems and methods for thermal protection materials are disclosed and described, it is to be understood that this invention is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present invention will be limited only by the appended claims and equivalents thereof.

The publications and other reference materials referred to herein to describe the background of the invention and to provide additional detail regarding its practice are hereby incorporated by reference. The references discussed herein are provided solely for their disclosure prior to the filing date of the present application. Nothing herein is to be construed as an admission that the inventors are not entitled to antedate such disclosure by virtue of prior invention.

It must be noted that, as used in this specification and the appended claims, the singular forms "a," "an," and "the" include plural referents unless the context clearly dictates otherwise. Thus, for example, reference to a cyanate ester resin containing "a cross-linker" includes a mixture of two or more cross-linkers, reference to "a solvent" includes reference to two or more of such solvents, and reference to "a catalyst" includes reference to a mixture of two or more catalysts.

Unless defined otherwise, all technical and scientific terms used herein have the same meanings as commonly understood by one of ordinary skill in the art to which this invention belongs.

In describing and claiming the present invention, the following terminology will be used in accordance with the definitions set out below.

As used herein, "comprising," "including," "containing," "characterized by," and grammatical equivalents thereof are inclusive or open-ended terms that do not exclude additional, unrecited elements or method steps.

As used herein, "CE" means cyanate ester resin, and "PHTH" means phthalonitrile resin.

As used herein, "PICA" means phenolic impregnated carbon ablator, "CPICA" means conformal phenolic impregnated carbon ablator, "CICA" means cyanate ester impregnated carbon ablator, and "PHICA" means phthalonitrile impregnated carbon ablator.

As used herein, "HMTA" means hexamethylenetetramine, "NMP" means N-methyl-2-pyrrolidone, and "DOTP" means dioctyl terephthalate.

Figure 1:
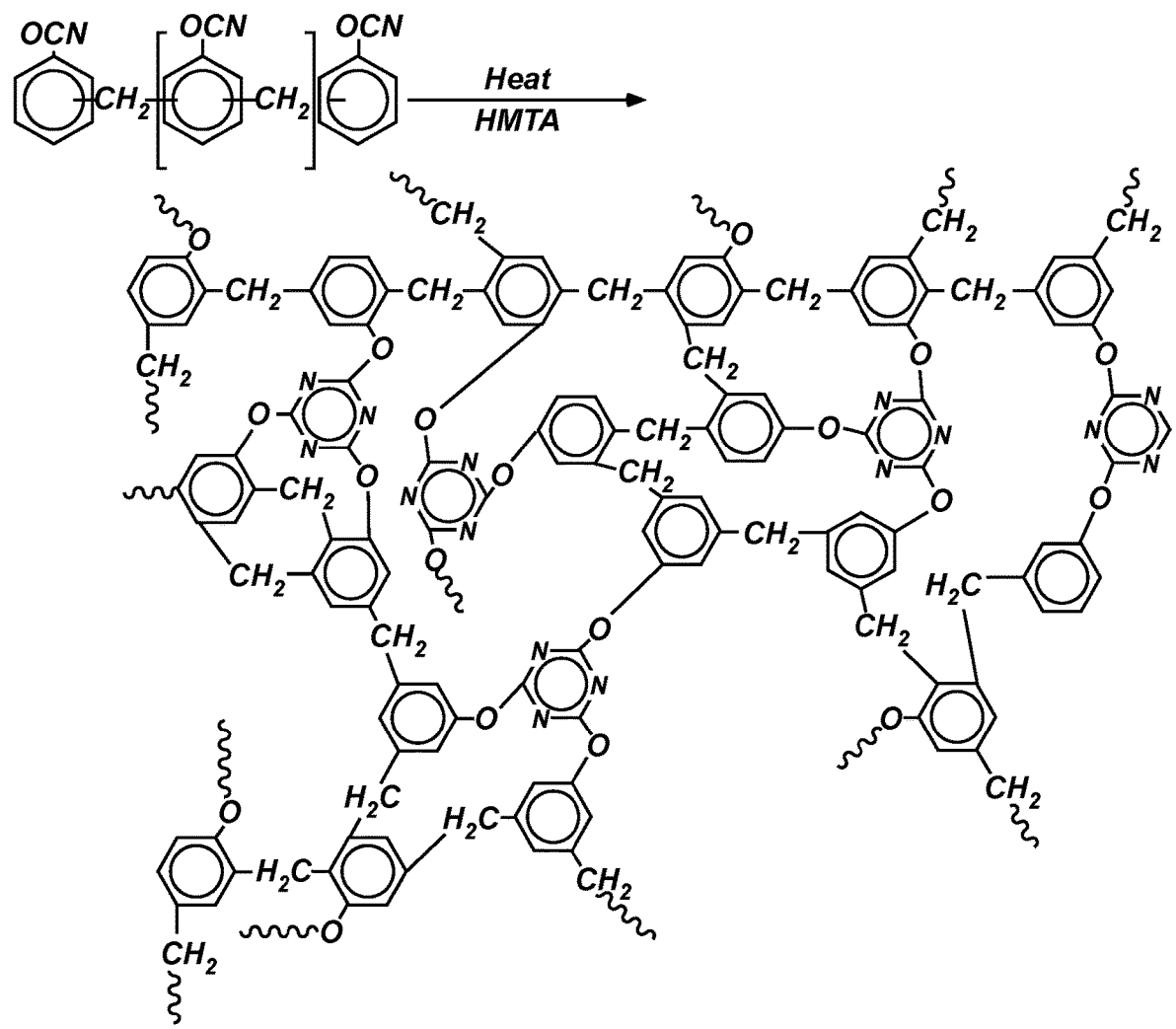
FIG. 1 shows a reaction after cyanate ester curing and crosslinking according to an illustrative embodiment of the invention.

This disclosure describes low density (0.2 to 0.35 g/cm$^3$) ablators similar to PICA, but using cyanate ester and phthalonitrile resin systems instead of phenolic resins. A cyanate ester resin system can be cured in a carbon matrix and generate a high surface area structure within the carbon fibers. This process helps to reduce the thermal conductivity of the resulting material, which is one of the aims of TPS materials. The resin is mixed with a solvent and a cross-linker, as illustrated in FIG. 1. This mixture is then infused into a carbon matrix, and the resin is cured at low temperature and the solvent removed. The resulting material has densities ranging from 0.2 to 0.35 g/cm$^3$. Similarly, a phthalonitrile resin system can be cured in a carbon matrix and generate a high surface area structure within the carbon fibers. This process helps to reduce the thermal conductivity of the resulting material. The resin is mixed with a solvent and one or more cross-linkers. The resulting mixture is infused into a carbon matrix, and the resin is cured at low temperature and the solven removed. The resulting material has densities ranging from 0.2 to 0.35 g/cm$^3$.

Cyanate ester resin is a thermoset resin that has high char stability, high decomposition temperature, low $O_2$ content, and high glass transition temperature (400 degrees C.). Phthalonitrile resin is another type of thermoset resin that has very high char stability, high decomposition temperature (480 degrees C.), indefinite ambient stability, ease of processing (by adding low moisture absorption), outstanding water resistance (<1% by weight at equilibrium), and high glass transition temperature (450 degrees C.). This resin can be cured in both air and inert gas without influencing the char yield. Both the cyanate ester and phthalonitrile resins have been processed to yield a morphology similar to that of the phenolic phase of PICA. These new polymer systems can be infused in carbon fibers as a matrix and cured at low temperatures.

Cyanate ester resin generates no volatiles during curing because the curing reaction is based on addition curing, as compared to condensation curing for the phenolic resin of PICA. The cyanate resin also has high thermal stability (decomposes at about 450 degrees C.), high glass transition temperature (about 400 degrees C.), high char stability due to having a low number of $O_2$-bearing functional groups to interact with the char and cause internal oxidation.

Phthalonitrile resin also generates no volatiles during curing, has high thermal stability (decomposes at about 480 degrees C.), high glass transition temperature (450 degrees C.), high char stability, low moisture absorption, and easy processing.

The resulting ablative TPS materials produced by infusing cyanate ester resin or phthalonitrile resin into carbon fiber or carbon felt substrates have low density, a unique polymer morphology akin to that of phenolic in PICA, higher thermal stability than phenolic, higher glass transition temperature than phenol, and high char stability.

Example 1

Preparation of Cross-Linked Cyanate Ester Resin

A cross-linked cyanate ester resin was prepared by mixing 0.084 g of HMTA as a cross-linker in 8 ml of adiponitrile as a solvent and mixing until a clear 5% HMTA solution was obtained. Then, 1.67 g of the commercially available cyanate ester Primaset® PT-30 (Lonza) was added to the solution and mixed. Curing occurred within about 4 hours at a temperature of up to about 280 degrees C.

Example 2

Preparation of Cross-Linked Cyanate Ester Resin

A cross-linked cyanate ester resin was prepared by mixing 1.67 g of Primaset® PT-30 cyanate ester with 8 ml of adiponitrile. After mixing, 0.05 g of HMTA was added and mixed to result in 3% HMTA. Curing occurred within about 4 hours at a temperature of up to about 280 degrees C.

Example 3

Preparation of Cross-Linked Phthalonitrile Resin

A cross-linked phthalonitrile resin was prepared by combining 1.666 g of phthalonitrile, 0.4165 g 4,4'-diaminodiphenylmethane, 0.04990 g of HMTA, 8 ml of NMP, and 4.0146 g of DOTP. After mixing, all ingredients were soluble, resulting in a clear solution. The resin was cured in air at 25 degrees C. to 200 degrees C. for about 48 hours. The cured resin was then subjected to a drying 280 degrees C. for 5 hours.

Example 4

Microstructure

PICA utilizes rigid carbon (FiberForm™, Fiber Materials Inc., Biddeford, Me.) infused with phenolic resin, and conformal PICA (CPICA) uses commercially available carbon felt (Morgan Advanced Materials, Windsor, U.K.) infused with phenolic resin. Both the rigid carbon and carbon felt were used as substrates in this example.

Cyanate ester (Lonza Inc., Basel, Switzerland) and phthalonitrile (Akron Polymer Systems, Akron, Ohio) were separately infused into rigid carbon and carbon felt substrates to mimic the microstructure and final density of the phenolic phase of PICA. Densities of between about 0.25-0.3 g/cm$^3$ were achieved in both carbon substrates with uniform distribution of the resin throughout. For comparison, the density of PICA is 0.28 g/cm³.

Samples of rigid carbon FiberForm™ were initially used to evaluate the processing of CICA and PHICA materials. Infusion sections were cut from the middle of an infused billet and investigated with scanning electron microscopy (SEM; Phillips ESEM30). All of the resins displayed a high surface area that fills the spaces between fibers without coating the fibers.

Example 5

Thermogravimetric Analysis (TGA)

Figure 2:
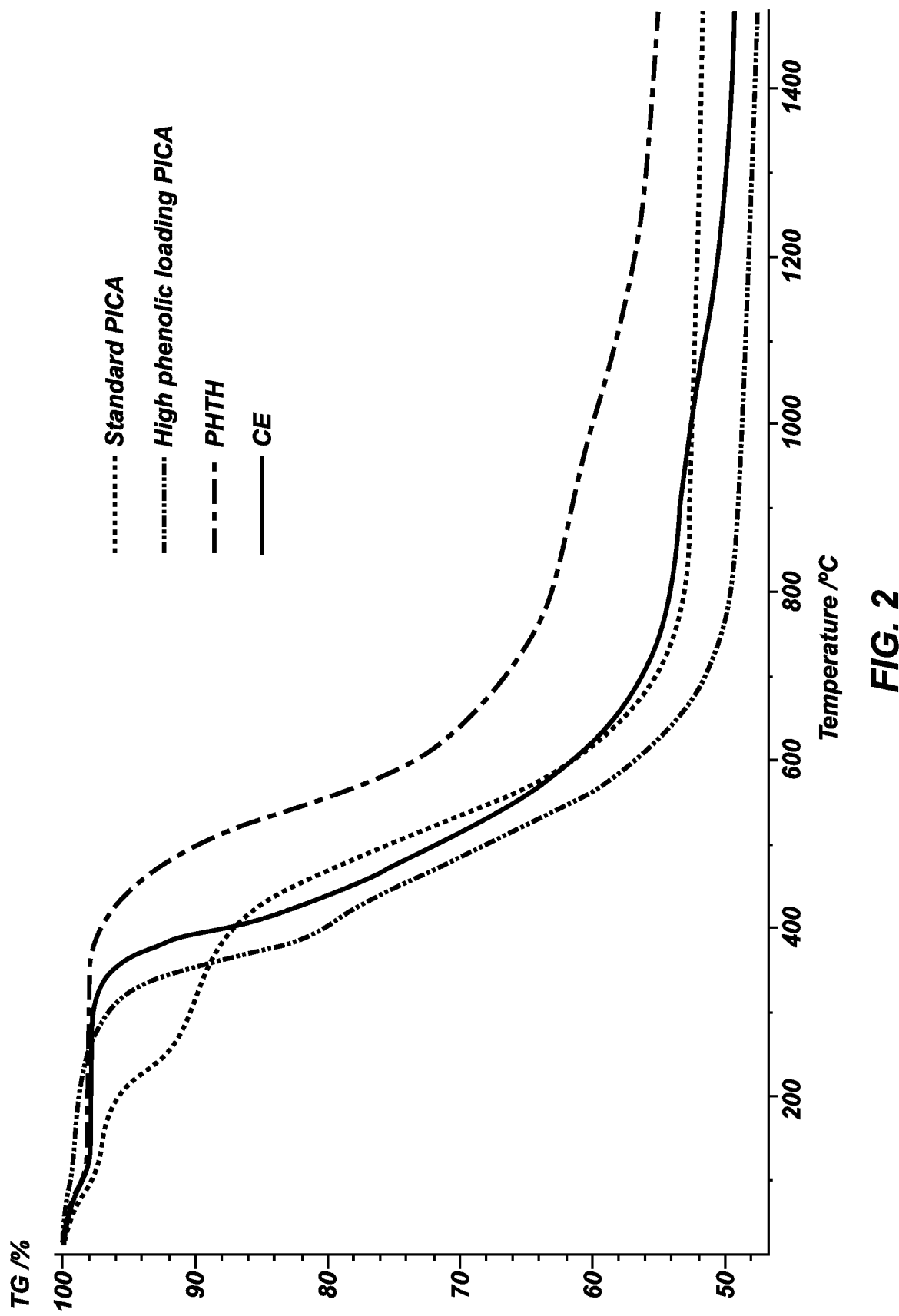
FIG. 2 shows results of thermogravimetric analysis (TGA) of cyanate ester resin (CE), phthalonitrile (PHTH), PICA, and CPICA (high phenolic loading PICA).

Thermogravimetric analysis (Netzsch STA 409PC) was run on cyanate ester (CE) resin and phthalonitrile (PHTH) resin, and the results were compared to those of PICA and CPICA (FIG. 2). All runs were performed on the resin without any substrate. Samples of 100 mg of each resin were tested in argon at 10 C/min. Results of the TGA analysis are shown in Table 1. PHTH showed the highest char yield of 62%, followed by the char yields of CE at 58%, PICA at 55%, and CPICA at 40%. The onset temperatures of the four resins were also evaluated. PHTH had the highest decomposition temperature at 407 degrees C., followed by CE at 353 degrees C., CPICA at 309 degrees C., and PICA at 280 degrees C.

TABLE 1

| Resin | Char Yield (%) | Onset Temp (C.) |
| --- | --- | --- |
| PICA | −58 | 280 |
| CPICA | −40 | 309 |
| CE | −58 | 353 |
| PHTH | −62 | −407 |

Example 6

Differential Scanning Calorimetry (DSC)

Figure 3:
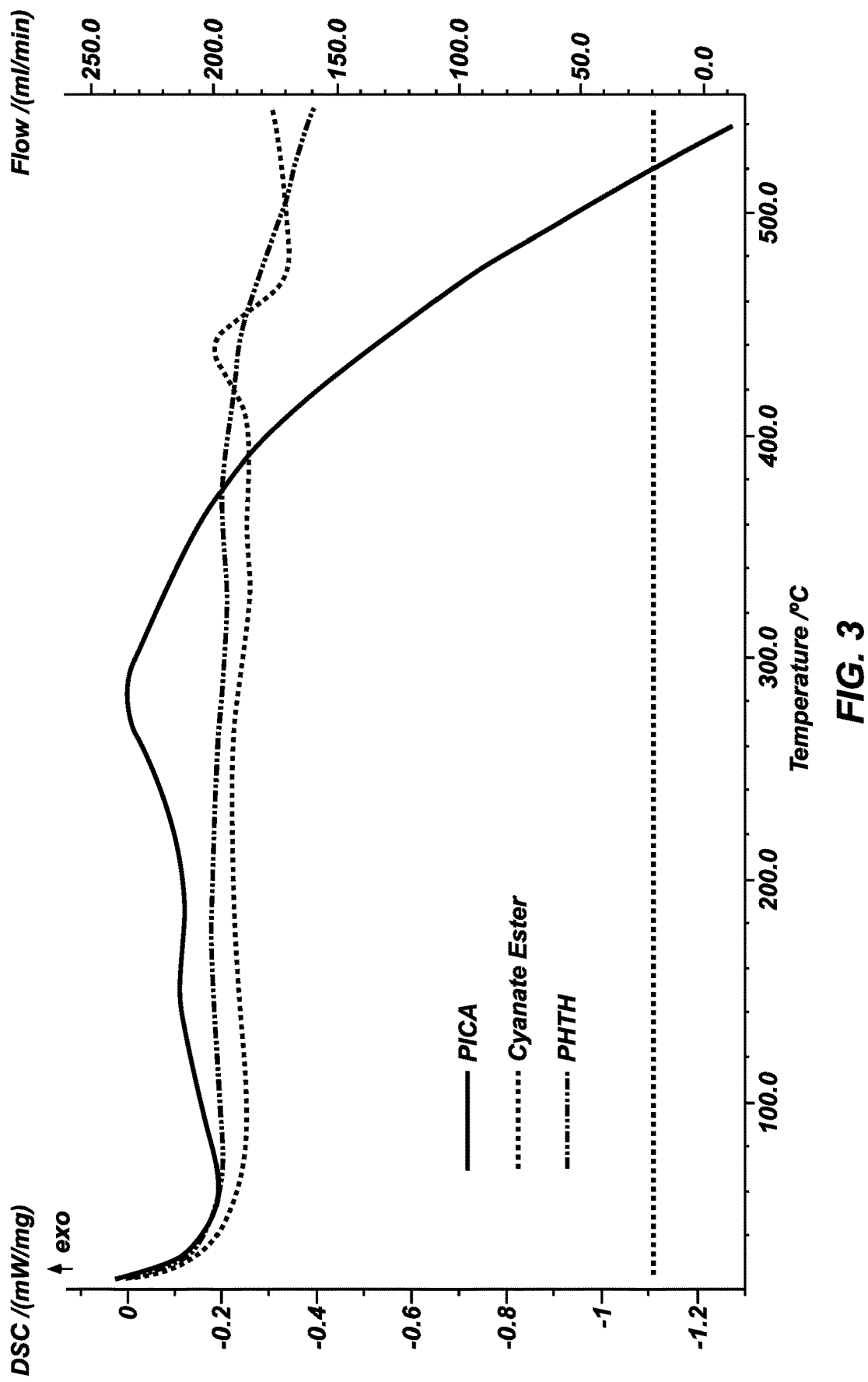
FIG. 3 shows results of differential scanning calorimetry (DSC) of CE, PHTH, and PICA.

Differential scanning calorimetry (DSC) (Netzsch DSC 404F1) was run on the CE and PHTH formulations and compared with PICA (FIG. 3). All three resins, without matrix, were ball milled into a very fine powder and run under ultrapure argon at 10 C/min. PICA had the lowest glass transition temperature of 219 degrees C., followed by CE at 400 degrees C. and PHTH at 505 degrees C.

Example 7

Thermal Conductivity

Thermal conductivities of PICA, CPICA, PHICA, and CICA infused into both rigid carbon FiberForm™ and Morgan carbon felt were measured by laser flash in a Netzch LFA457 under nitrogen at 50 degrees C./min. Thermal conductivity (K) was then calculated from thermal diffusivity ($\forall$), density ($\Delta$), and heat capacity ($C_P$) according to the formula K=$\forall \Delta C_P$. Table 2 shows the results obtained in rigid carbon FiberForm™, and Table 3 shows the results obtained in Morgan carbon felt.

TABLE 2

| Resin | Thermal Conductivity | Density | Thermal Diffusivity |
| --- | --- | --- | --- |
| PICA | 0.6 | 0.28 | 2.93 |
| CICA | 0.59 | 0.3 | 2.66 |
| PHICA | 1.55 | 0.46 | 3.6 |

TABLE 3

| Resin | Thermal Conductivity | Density | Thermal Diffusivity |
| --- | --- | --- | --- |
| PICA | 0.17 | 0.2 | 1.31 |
| CPICA | 0.24 | 0.28 | 0.87 |
| CICA | 0.48 | 0.32 | 1.09 |
| PHICA | 0.39 | 0.35 | 1.44 |

Example 8

Hypersonic Materials Evaluation Test System (HyMETS) Aerothermal Testing

Alternate resin conformal ablative thermal protection materials were tested at the HyMETS facility at NASA Langley Research Center. The HyMETS test setup used a segmented arc heater as the air plasma generator. The air plasma generator contains a copper cathode with tungsten button, 32 copper segments with a 1.27 cm (0.5 inch) diameter core and 6 discrete test gas injection locations, a sterling silver anode, and a copper Mach 5 nozzle with 1.27 cm (0.5 inch) diameter throat, 6.35 cm (2.5 inch) diameter exit plane, and a nozzle half-angle of 8 degrees.

Conformal ablator samples were subjected to HyMETS testing at cold wall heat flux of 400 W/cm², stagnation pressure of 0.05 atm, bulk enthalpy of 40.9 kJ/g, and test time of 30 sec to support selection of the most promising materials for further development. This test condition is currently the maximum facility capability for a 3.3 cm (1.3 inch) diameter sample. Since this was a screening test, all specimens were tested at the same heating and pressure conditions, in air.

Ablator test specimens were fabricated with a 2.5 cm (1 inch) diameter and 2.2 cm (0.865 inch) thickness. All specimens included one Type K backface thermocouple. Each ablator test specimen was bonded into a 3.3 cm (1.3 inch) outer diameter tile collar to minimize side heating effects. A graphite sting adapter was bonded to the back of each assembly for interface to the HyMETS sting arm.

The instrumentation for these tests comprised a two-color pyrometer to measure surface temperature, a Gardon gauge to measure cold wall heat flux, and a Pitot tube to measure stagnation pressure. Bulk enthalpy calculation was made using a thermocouple to measure the differential temperature across the inlet and outlet of the cooling water manifolds for the arc plasma generator and flow meters to measure the mass flow rates for both the cooling water and arc column test gas.

Table 4 lists the density and recession measure on PICA and formulations of CICA and PHICA, all of which were infused in rigid carbon FiberForm™. PICA exhibited the lowest recession and also yielded the lowest measured surface temperature (2260 degrees C.), with CICA at 2449 degrees C. and PHICA at 2445 degrees C. The high recession for PHICA was likely due to the lower density of that sample as compared to the other samples tested.

TABLE 4

| Resin | Density (g/cm³) | Recession (mm) |
|---|---|---|
| PICA | 0.22 | 1.2 |
| CICA | 0.34 | 1.8 |
| PHICA | 0.17 | 2.5 |

Table 5 lists the density and recession measured for the resins wherein they were infused in carbon felt. The densities of these samples were better matched than those of the results shown in Table 4, and the recession of all samples was also comparable. During this test series, the surface temperatures of the samples was also much more consistent, averaging 2400 degrees C.

TABLE 5

| Resin | Density (g/cm³) | Recession (mm) |
|---|---|---|
| PICA | 0.25 | 3.2 |
| CPICA | 0.25 | 3.2 |
| CICA | 0.30 | 3.0 |
| PHICA | 0.24 | 3.2 |

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

The subject matter claimed is:

1. A method of making a thermal protection material, the method comprising:
    (A) forming a resin solution consisting of a mixture of a cyanate ester resin, a solvent and a cross-linker;
    (B) infusing the resin solution into a substrate; and
    (C) curing the resin in the presence of the solvent to result in the thermal protection material;
wherein the thermal protection material has a density of about 0.2 to 0.35 g/cm³ and wherein the cross-linker is hexamethylenetetramine.

2. The method of claim 1 wherein the solvent comprises adiponitrile, dimethylsulfoxide, N-methyl-2-pyrrolidone, or mixtures thereof.

3. The method of claim 1 wherein the substrate comprises carbon fibers or carbon felt.

4. The method of claim 1 wherein the resin is cured at a temperature of up to about 280 degrees C.

5. The method of claim 1 wherein the amount of hexamethylenetetramine in the resin solution ranges from 3 to 5% by weight with respect to the cyanate ester resin.

6. A method of making a thermal protection material, the method comprising:
    (A) mixing phthalonitrile with a solvent and two cross-linkers comprising hexamethylenetetramine and 4,4'-diaminodiphenylmethane to result in a resin solution;
    (B) infusing the resin solution into a substrate; and
    (C) curing the resin in the presence of the solvent to result in the thermal protection material.

7. The method of claim 6 wherein the solvent comprises adiponitrile, dimethylsulfoxide, N-methyl-2-pyrrolidone, or mixtures thereof.

8. The method of claim 6 wherein the substrate comprises carbon fibers or carbon felt.

9. The method of claim 6 wherein the resin is cured at a temperature of up to about 280 degrees C.

10. The method of claim 6 wherein the thermal protection material has a density of about 0.2 to about 0.35 g/cm³.

11. The method of claim 6 wherein the resin solution further comprises dioctyl terephthalate.

12. The method of claim 11 wherein the solvent is N-methyl-2-pyrrolidone.

13. The method of claim 12 wherein the weight ratio of hexamethylenetetramine to phthalonitrile is 0.3.

14. The method of claim 13 wherein the weight ratio of hexamethylenetetramine to 4,4'-diaminodiphenylmethane is 0.12.

15. The method of claim 6 wherein the weight ratio of hexamethylenetetramine to phthalonitrile is 0.3.

16. The method of claim 15 wherein the weight ratio of hexamethylenetetramine to 4,4'-diaminodiphenylmethane is 0.12.

17. A method of making a thermal protection material, the method comprising:
    (A) forming a resin solution consisting of a mixture of a cyanate ester resin, a solvent and a cross-linker;
    (B) infusing the resin solution into a substrate; and
    (C) curing the resin in the presence of the solvent to result in the thermal protection material;
wherein the thermal protection material has a density of about 0.2 to 0.35 g/cm³, and wherein the solvent is adiponitrile.

18. The method of claim 17 wherein the substrate comprises carbon fibers or carbon felt.

19. The method of claim 17 wherein the resin is cured at a temperature of up to about 280 degrees C.

20. A method of making a thermal protection material, the method comprising:
    (A) forming a resin solution consisting of a mixture of a cyanate ester resin, a solvent and hexamethylenetetramine;
    (B) infusing the resin solution into a substrate; and
    (C) curing the resin to result in the thermal protection material.

21. The method of claim 20 wherein the resin is cured in the presence of solvent.

22. The method of claim 20 wherein the solvent is adiponitrile.

23. The method of claim 20 wherein the amount of hexamethylenetetramine in the resin solution ranges from 3 to 5% by weight with respect to the cyanate ester.

24. The method of claim 20 wherein the substrate is carbon fibers or carbon felt.

25. The method of claim 20 wherein the substrate is carbon fibers or carbon felt, the solvent is adiponitrile, and the amount of hexamethylenetetramine in the resin solution ranges from 3 to 5% by weight with respect to the cyanate ester resin, the resin is cured in the presence of the solvent, and the thermal protection material has a density of about 0.2 to about 0.35 g/cm$^3$.

\* \* \* \* \*